Jan. 11, 1966     J. P. WATTERSON     3,228,452
SAFETY CUTTING AND BURNING DEVICE
Filed Jan. 9, 1963
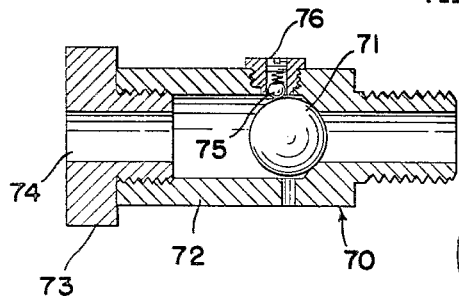
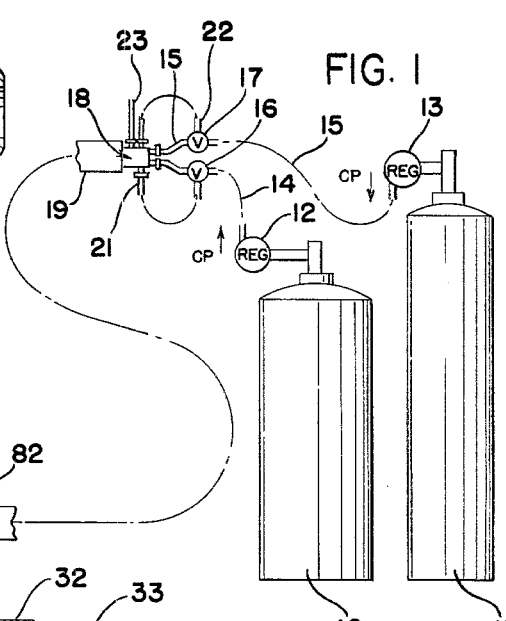
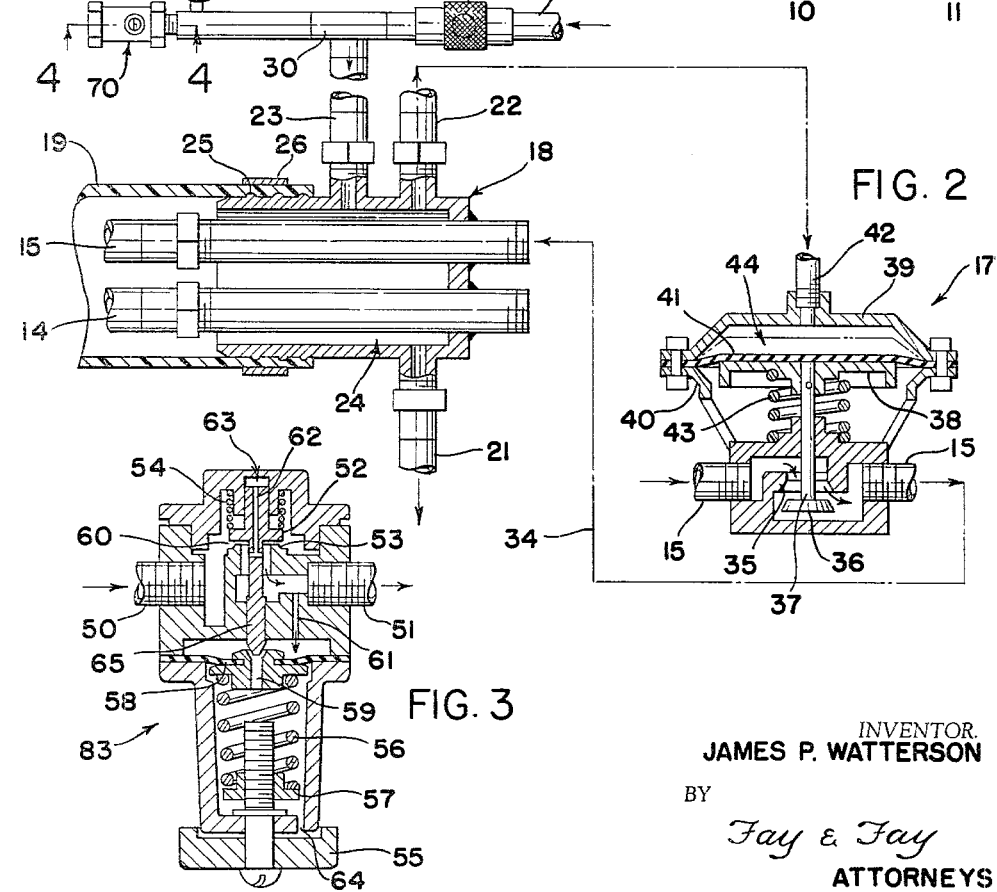
INVENTOR.
JAMES P. WATTERSON
BY
*Fay & Fay*
ATTORNEYS United States Patent Office 3,228,452
Patented Jan. 11, 1966

3,228,452
SAFETY CUTTING AND BURNING DEVICE
James P. Watterson, Salem, Ohio, assignor to International Basic Economy, Salem, Ohio and Akron, Ohio, a corporation of New York
Filed Jan. 9, 1963, Ser. No. 250,359
5 Claims. (Cl. 158—132)

This invention relates to a safety device for burning and cutting torches and like devices. More particularly, the invention is directed towards a novel supply line providing for encasement of the fuel and combustion supporting line within a shield or third line which is pressurized. Suitable means is provided automatically to terminate flow through the lines upon rupture of the shield and/or the encased lines. As an optional feature, the instant invention further contemplates the provision of a valve means accurately to adjust and regulate pressure in the encased lines without requiring the downstream portion of the line to be vented.

The conventional cutting or burning torch has found wide application in industry, especially in shipbuilding and repairing, steel mills, machine shops, novelty shops, automobile hospitals, and like environments. Since the conventional torch utilizes a highly combustible fuel in combination with a combustion supporting fluid, the combining of these fluids, other than at the torch where such combining may be controlled, presents a dangerous situation. For example, if either or both of the fluid lines carrying the fuel and combustion supporting fluid were to become ruptured short of the torch and ignition were to occur, the pressure in the lines would cause the same to whip, thereby spewing flames all about the immediate area until the operator could reach the source of supply and cut off the fluid flow in the lines. In the interim, because of the high heat attendant when such a mixture is ignited, serious damage to the building or structure, its contents and bystanders, could occur.

In the above mentioned environments, it is not uncommon to see lengths of welding hose lying on the floor, where they are subjected to severe abrasion and cutting by the sharp edges of falling objects, thereby rupturing the lines. Particular danger of rupture occurs in the scarfing operation, which consists of burning of scale and removing hair line cracks from steel slabs through the use of a large torch which utilizes dry oxygen and natural gas. The slab is heated to an extremely high temperature in order to burn off rust and other scale deposits as well as close the fine cracks. If a hot slab should accidentally come in contact with the oxygen and gas lines, thereby cutting or burning through them, one has to contend with the whipping, fiery, snake-like hose heretofore mentioned. The possibility of this dangerous situation occurring can be obviated by employment of the present invention.

As will become apparent, the instant invention broadly contemplates the use of a means to isolate the fuel and combustion supporting fluid lines from the normal abrasion which would be found in the environments mentioned above. Moreover, it provides a shield or closed chamber which, when ruptured, will automatically cut off the fuel and combustion supporting fluid flow. Further, it provides means whereby slight internal rupture of the fuel fluid hoses would be immediately detectible by the operator of the torch, so that he may terminate the burning operation in the event it is not automatically done, as will be hereinafter described.

Often it is desirable, in applications requiring the tanks to be quite far removed from the torch, to adjust the pressures in the fuel and combustion supporting fluid lines so as to obtain the correct pressures for optimum results in the burning or welding operation undertaken. With prior arrangements, the welder or burner had to drag the torch and hose back to the master valves and gauges at the source. The torch valves would then be opened to bleed the downstream pressure so that the gauges at the source would read correctly, and then the proper adjustments of the master valves could be made to obtain the proper pressure setting. This involves considerable effort, time and difficulty, as one might surmise, when the apparatus is used in any of the heretofore mentioned environments. A solution to this problem is embodied by the present invention, as will hereinafter become apparent.

It is therefore an object of this invention to provide a new safety device for welding, brazing and burning apparatus.

It is a further object of this invention to provide means whereby rupture in the line will cause cessation of flow of fuel and combustion supporting fluid.

It is a still further object of this invention to provide means whereby slight internal rupture in the fuel line will be detectable by the operator of the torch in the absence of a leak severe enough to cut off flow.

It is a still further object of this invention to provide means whereby rupture of the combustion supporting line within the shield will automatically cause cessation of flow to the fuel and combustion lines.

It is a still further object of this invention to provide a protective shield around the fuel and combustion supporting fluid lines.

It is a still further object of this invention to provide a bleed off regulator means in a cutting and burning assembly to adjust the pressures in the lines when flow has ceased.

Further and fuller objects will become readily apparent when reference is made to the accompanying drawing, wherein like reference characters refer to like parts.

In the drawings:

FIG. 1 is a schematic view of a welding, burning or cutting apparatus, illustrating diagrammatically the flow lines to feed the torch;

FIG. 2 is a cross-sectional view of the manifold illustrating the juncture of the fuel and combustion supporting hoses within the third hose and diagrammatically connected to a diaphragm valve shown in cross section;

FIG. 3 is a cross-sectional view of one of the types of pressure regulators indicated schematically in FIG. 1 which may be used; and FIG. 4 is an enlarged view of the pop-off valve shown in FIG. 2, taken on line 4—4.

Referring now to FIG. 1, therein is shown diagrammatically a welding or burning arrangement. The fuel is supplied by a tank 10, although it is contemplated that, in burning operations, connection could be made to natural gas or another suitable source of fuel. The combustion supporting tank is indicated generally at 11. Each of the lines has regulators 12 and 13 which may be of the conventional type. Suitable lines 14 and 15 connect the fuel combustion supporting tanks to the valves, as indicated diagrammatically at 16 and 17. The valves 16 and 17 are adjacent the manifold 18 wherein the two tubes are encased in the third tube 19. The lines 14 and 15 extend through the line 19 to a point where they emerge from the third line 19 through a manifold 82 and are connected through control valves 80 and 81 to a torch or burning nozzle indicated generally at 20. The valves 80 and 81 may be of the conventional type. In an optional embodiment of the invention an additional pair of regulators of the type shown in FIG. 3 may be inserted in the respective lines at 83 and 84 between the valves 80 and 81 and the manifold 82. This type of regulator allows the operator to regulate the pressure at the torch after having set the high pressures at the supply. In applications where the hose lengths are relatively short, the regulators, shown schematically at 83 and 84, may be placed at the supply immediately downstream of the regulators 12 and 13. The use of the valves shown in FIG. 3 in this embodiment facilitates accurate setting of line pressures without bleeding the downstream line, which could be desirable to alleviate respiratory difficulties and possibility of explosion when working in confined areas.

Referring now to FIG. 2, therein is shown the manifold 18 which joins fluid lines 14 and 15 fluid-tightly to fluid line 19 and functions to provide fluid for the pressure responsive valves 16 and 17. The manifold 18 is provided with a number of fluid ports 21, 22 and 23. An axial extension may be ribbed, such as at 25, in order that the clamping band 26 will fluid-tightly clamp the fluid 19 to the manifold 18. The conduit 21 communicates with the chamber 24 which is formed by closing off the fluid line 19 with the manifold 18 and manifold 82 adjacent the torch 20. The fluid port 21 has a closed line in communication with a diaphragm chamber of the valve 16, which will be hereinafter described more fully. Fluid line 22 communicates with the chamber 24 and similarly has a closed line which extends to the diaphragm chamber 44 of the valve 17. Fluid port 23 is provided with a T fitting 30 which is provided with a pop-off valve 70, for purposes hereinafter described, and a gauge 31 at one end, so that the pressure in the chamber 24 may be known at all times.

The pop-off valve 70, shown in FIGS. 2 and 4, is provided with a ball member 71 in the body 72. A cap 73 has a central aperture 74 to facilitate resetting the ball 71 with a rod or like tool, once the pressure set by the spring biased detent 75 has been exceeded. A set screw 76 allows adjustment so the valve may be selectively set to pop-off over a wide range of pressures.

The T fitting 30 is provided at its opposite end with a one-way valve means 32 to insure that the chamber 24 will remain pressurized. A fluid line 33, shown fragmentarily, connects line 23 and chamber 24 to a source of compressed air, inert gas, or other suitable isolating medium. It is contemplated that the chamber 24 may be filled and closed, obviating the need for connection to a continuous source of supply. However, this would be a matter of choice to be made in light of the proposed use, and existing safety codes.

The fluid line 15 is indicated as being connected to the valve 17 through dotted line 34. A diaphragm valve of the usual construction with a seat 35 and member 36 is connected to a shank 37 which is, in turn, connected to a plate 38. A cover 39 is fastened to the lower base 40 with the peripheral edge of a diaphragm 41 clamped therebetween. The cover 39 is tapped as at 42 to receive the fluid line, which is represented by dotted lines as communicating with the port 22. A spring 43 attempts to bias the valve closed in the absence of any pressure in the chamber 44. Various sizes and strengths of spring may be used so as to adjust the opening and closing pressure of the valve 17. It is contemplated that differential or straight piston type valves housed in the manifold may be used in lieu of the diaphragm valve shown. Other forms of pressure responsive valves may be appropriate also, depending upon the particular application.

In the illustrated embodiment it can thus be seen that when the chamber 24 is pressurized, the pressure acting on the upper surface of the diaphragm 41 forces the shaft 37 and button-headed member 36 downward to open the valve and allow flow therethrough. In the absence of pressure in the chamber 44, the spring automatically closes the valve thereby to cut off the flow to the torch 20.

In one concrete embodiment the pressure in the fuel line 14 would be of the order of 15 to 18 p.s.i. In the combustion supporting line 15, pressures would be of somewhat higher magnitude, such as 125 p.s.i. for the scarfing operation. The pressure in the chamber 24 would be greater than that of the fuel line 14 and lesser than the line 15, for example, 30–35 p.s.i. The indicated pressures are by way of example only. The important feature of such pressures in their respective relationships, i.e., the fluid in the chamber 24 should be at a greater pressure than the fuel line 14 and lesser than the combustion supporting line 15. In the event the fuel line 14 should rupture, the pressure in the chamber 24 being greater, the fluid therein will leak inward into the lines 14, thereby giving notice to the user of the torch that the mixture has been contaminated. The user will recognize the symptoms as indicating an internal break in the fuel line. He may then close off the valve to shut off the fluid. If the leak is of a magnitude which will reduce the pressure in the chamber 24, flow in the lines 14 and 15 will be automatically terminated.

If rupture of the combustion supporting line should occur while the chamber 24 is still fluid tight, the increase in pressure in the chamber 24 will serve to blow the safety pop-off valve 70, reducing the pressure in the chamber 24 and thereby automatically terminating flow in the lines 14 and 15.

The example cited above is but one embodiment which will suggest itself to those having ordinary skill in the art. It is the preferred embodiment since it provides a means whereby a leakage in either of the fuel line or the combustion supporting line may be detected. In the event that the pressure in the chamber 24 is greater than the pressure in both of the fuel line 14 and the combustion supporting line 15, different conditions would exist upon the rupture of either line. In the case of the fuel line, a rupture would permit the fluid in the chamber 24 to leak into the line 14 and, in the manner described above, give notice to the user of the torch that the mixture has been contaminated. In the event that the combustion supporting line should rupture with the chamber 24 still in tact, the fluid in the chamber 24 will tend to leak into the combustion supporting line. If this occurs to a substantial extent, the pressure in the chamber 24 may be reduced and the diaphragm valves may be actuated to shut off flow to the fuel and combustion supporting lines. In the event of a small leak and a significant pressure drop in the chamber 24 does not occur, the operator may still notice a difference in the flame due to the change in fluid pressure in the combustion supporting line and, therefore, shut off the torch and inspect the apparatus for a leak. However, a pressure variation in line 15 is not as noticeable as contamination in the fuel line 14, so the rupture in line 15 may not be detected as easily when the pressure in chamber 24 exceeds the pressure in line 15.

As so often occurs, when welding and burning lines are placed about a ship, steel mills, welding shops and the like, they are exposed to sharp edges, objects being dropped on them, and hot pieces of metal coming in contact therewith. Quite frequently a heavy slab of metal falls on the lines when they are unprotected and severs the same, thereby allowing whipping of the hose in a snake-like fashion with the end ignited from the sparks that are attendant therewith or the heat of the torch. This objection is completely obviated with the instant invention. The outer line 19 is of tough material so as to protect the inner lines from sharp edges, thereby lengthening the average life thereof. Moreover, whenever the outer line is severed, the pressure drop in the chamber 24 is felt in the chamber 44 of the diaphragm and the spring automatically closes off the valve. It thus can be seen that should the lines be severed, flow will be automatically cut off, thereby overcoming the hazards noted. A further advantage of encasement of the two lines in a third, preventing the two from becoming twisted and bent sharply, is longer life. Further, the inner lines are protected from sharp objects and damage from continual abrading on rough surfaces, such as floors or the like.

The optional feature of a novel method of adjusting the pressure in the fuel and combustion lines, without requiring bleeding of the downstream lines, will now be explained. The valve shown in cross section in FIG. 3 depicts regulator valves indicated at 83 and 84 in FIG. 1. As pointed out previously, adjustment of the pressure in prior arrangements generally required the welder or burner to carry his torch to the source of supply and open the torch so as to bleed off the downstream pressure while adjusting the valves to obtain the proper pressure at the source. This was time consuming and cumbersome, especially in ships where a maze of passageways, compartments, ladders and the like exist. It was similarly cumbersome in steel mills, welding shops and like environments. Such difficulty is obviated by the pressure regulator used in the embodiment shown, since the valves are adjacent the torch where they may be adjusted to suit the operator's needs. As noted above, where the length of hose is not excessive, the regulators 83 and 84 may be placed at the supply with the same resultant effect.

As seen in FIG. 3, the valves 83 and 84 have a primary source 50, and a regulated source at 51. The pressure entering at 50 cannot pass beyond the seat engaging member 52 as it is held against the seat 53 by the spring 54, in addition to the force generated by the pressure working against the back of the seat engaging member 52. In order to regulate the pressure on the downstream side of the regulator, the control knob 55 is rotated to exert a pressure on the spring 56 through the traveling nut 57. The spring pressure is transmitted against the diaphragm assembly 58, which in turn transmits the movement or pressure to the valve stem 65, which carries the flange member 52. Such action forces the flange member 52 away from the seat 53 creating an opening 60 between the two. The opening 60 operates substantially in a fashion analogous to an orifice, that is, by controlling the size of the orifice, the amount of pressure dropped between the inlet 50 and the outlet 51 can be precisely controlled.

It follows that the greater the regulator spring pressure, the greater the opening at 60 and, consequently, the higher the pressure at 51, up to the point where the pressure is equalized. When there is zero flow at 51 or, in the instant case, the torch has been shut off, the demand for flow through the port 51 has ceased, the static fluid acting on the diaphragm assembly 58 through the port 61 forces the diaphragm against the spring 56 thereby allowing the stem 65 and opening 60 to close. Subsequently, when there is a demand for flow through the port 51, a pressure drop occurs in the diaphragm chamber resulting in the regulating spring 56 expanding to push the valve 65 off its seat to create the opening 60. Only a slight pressure drop is required to assure the instantaneous action of the regulator. This is accomplished through the use of the port 62 through the stem 65 which fills the chamber 63 with pressure fluid. The pressure in the chamber 63 supplements the spring 54 as well as the diaphragm assembly 58 to close the valve very quickly. When a demand for air exists downstream, and the pressure drop heretofore mentioned is created in the diaphragm area, a similar pressure drop occurs in the chamber 63 allowing the regulating spring to open the orifice 60 quickly to take care of the demand.

For example, if the downstream or regulated pressure is set for 70 p.s.i. and the user wishes to decrease it to 40 p.s.i. without bleeding the downstream line (i.e., opening the torch valves), he may do so by turning the regulating knob in a counterclockwise direction to relieve the tension on the regulating spring. With the downstream pressure pushing on the diaphragm assembly 58, it will quickly and momentarily open the relief port 59 to allow the excess pressure in the downstream line to bleed off through the opening at 64. The bleed off or pressure relief will occur whenever there is a build-up of regulated air back into the regulator, such build-up tending to increase the downstream pressure over the pre-set pressure.

Through the utilization of the regulator valve in the apparatus shown, it is easily seen that the proper pressure may be set for the fuel and combustion supporting supplies without bleeding the downstream line, which could be dangerous in confined quarters.

It can thus be seen that a novel welding and burning arrangement has been presented which will obviate the objections heretofore mentioned. Although a single preferred embodiment has been shown, it is not intended that this be limiting inasmuch as such is necessary for ease of description of the invention. It is intended only that the limits of the invention be defined by the scope of the appended claims.

I claim:
1. In combination;
    a manually manipulatable cutting and burning torch adapted to utilize a combustible mixture;
    a pair of elongated flexible fluid lines connected to said torch;
    the first of said fluid lines supplying a fuel type fluid at a first pressure level;
    the second of said fluid lines supplying a combustion supporting fluid at a second pressure level;
    control valve means on said torch in communication with said first and second fluid lines thereby to control the flow of fluid through said lines to said torch;
    a third elongated flexible fluid line enclosing said first and second lines and fluid tightly sealed from the atmosphere to said lines at one end adjacent said control valves on said torch;
    means fluid tightly sealing said elongated flexible third line at its other end to said first and second lines at a point remote from said torch thereby to provide a fluid chamber about said first and second lines internally of said third line;
    means connecting said fluid chamber to a source of fluid pressure whereby said chamber may be pressurized to a predetermined level;
    additional flow control means for each of said first and second fluid lines;
    each of said additional flow control means being remote from said control valve means and comprising a diaphragm valve with means including a flexible diaphragm member forming a closed diaphragm chamber;
    a reciprocally mounted valve member extending to said flexible diaphragm member, with said valve member adapted to interrupt the flow of fluid in the respective fluid line; and
    spring means normally urging said valve member to a closed position;
    conduit means operatively connecting said fluid chamber with said diaphragm chamber in each of said flow control means whereby said predetermined level of fluid pressure in said fluid chamber normally overcomes the bias of said spring means and opens said valve member thereby to permit the flow of fluid through said first and second lines and a loss of pressure in said fluid chamber permits said spring means to return each of said valve members to a closed position cutting off the flow of fluid in each of said first and second lines.

2. A safety cutting and burning device comprising in combination:
    a torch which burns a combustible mixture,
    a plurality of elongated flexible fluid line means connected to said torch,
    the first of said fluid line means adapted to supply a fuel type fluid,
    the second of said fluid lines adapted to supply a combustion supporting fluid, a third fluid line surrounding said first and second lines and being in fluid-tight relationship thereto, said third line being fluid-tightly sealed from the atmosphere to said lines at one end adjacent said torch, means fluid-tightly sealing said third line at its other end to said first and second lines so as to provide a fluid chamber about said lines, means connecting said fluid chamber to a source of fluid pressure other than the atmosphere, the pressure in the chamber when the chamber is pressurized being greater than the pressure of the fluid adapted to be supplied in the first fluid line and less than that of the fluid adapted to be supplied in the second fluid line, diaphragm valve means in each of said first and second lines to control flow therethrough, conduit means connecting said fluid chamber to each of said diaphragm valve means with the fluid pressure in said chamber adapted to hold said valves open when said chamber is pressurized whereby rupture of said third line when it is pressurized will automatically cut off flow to said first and second fluid lines, and a pop-off valve in fluid communication with said chamber.

3. The safety device of claim 2 wherein the means fluid-tightly sealing said third line at its other end to said first and second lines comprises a manifold having a plurality of ports therein.

4. The safety device of claim 2 wherein each of said first and second lines is provided with a regulator upstream from the torch to allow adjustment of the pressure without bleeding of said lines.

5. The combination of claim 1 wherein the pressure in the chamber when the chamber is pressurized is normally greater than the fluid pressure in at least the first fluid line whereby fluid in the chamber will leak into said first line when said first line is ruptured and thereby be noticeable by the operator of the torch.

References Cited by the Examiner

UNITED STATES PATENTS

| 2,413,087 | 12/1946 | Urbany | 158—42.1 |
| 2,707,864 | 5/1955 | Taylor | 158—42.2 X |
| 2,923,288 | 2/1960 | Burtt | 158—42.2 X |
| 2,937,923 | 5/1960 | Shapleigh | 23—288.92 X |

FOREIGN PATENTS

| 554,477 | 3/1923 | France. |
| 886,674 | 1/1962 | Great Britain. |

OTHER REFERENCES

German printed application, No. 1,102,065, printed June 14, 1955.

FREDERICK L. MATTESON, JR., *Primary Examiner.*

MEYER PERLIN, JAMES W. WESTHAVER,
*Examiners.*